(12) United States Patent
Brown

(10) Patent No.: US 9,630,137 B2
(45) Date of Patent: Apr. 25, 2017

(54) ANTI-CLOGGING FILTER SYSTEM

(71) Applicant: LAWRENCE LIVERMORE NATIONAL SECURITY, LLC., Livermore, CA (US)

(72) Inventor: Erik P. Brown, Tracy, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 147 days.

(21) Appl. No.: 14/661,067

(22) Filed: Mar. 18, 2015

(65) Prior Publication Data

US 2015/0190746 A1 Jul. 9, 2015

Related U.S. Application Data

(62) Division of application No. 13/610,331, filed on Sep. 11, 2012, now Pat. No. 9,034,066.

(60) Provisional application No. 61/535,713, filed on Sep. 16, 2011.

(51) Int. Cl.
*B01D 50/00* (2006.01)
*B01D 45/12* (2006.01)
*B01D 46/24* (2006.01)
*B01D 46/42* (2006.01)
*B01D 45/16* (2006.01)
*B01D 46/00* (2006.01)

(52) U.S. Cl.
CPC ........... *B01D 50/002* (2013.01); *B01D 45/12* (2013.01); *B01D 45/16* (2013.01); *B01D 46/002* (2013.01); *B01D 46/2407* (2013.01); *B01D 46/2411* (2013.01); *B01D 46/42* (2013.01)

(58) Field of Classification Search
CPC B01D 46/04; B01D 46/0043; B01D 46/0068; B01D 46/24; B01D 2265/022; B01D 46/002; B01D 46/2411; B01D 46/0065; B01D 46/0075; B01D 50/002; B01D 45/16; B01D 45/12; B01D 46/2407; B01D 46/42
See application file for complete search history.

(56) References Cited

U.S. PATENT DOCUMENTS

| | | | |
|---|---|---|---|
| 3,093,467 A | | 6/1963 | McLaughlin |
| 3,339,350 A | * | 9/1967 | Sims ...................... B01D 46/10 55/320 |
| 3,378,993 A | | 4/1968 | Veres et al. |
| 3,429,108 A | * | 2/1969 | Larson ................... B01D 46/24 137/850 |

(Continued)

*Primary Examiner* — Dung H Bui
(74) *Attorney, Agent, or Firm* — Eddie E. Scott

(57) ABSTRACT

An anti-clogging filter system for filtering a fluid containing large particles and small particles includes an enclosure with at least one individual elongated tubular filter element in the enclosure. The individual elongated tubular filter element has an internal passage, a closed end, an open end, and a filtering material in or on the individual elongated tubular filter element. The fluid travels through the open end of the elongated tubular element and through the internal passage and through the filtering material. An anti-clogging element is positioned on or adjacent the individual elongated tubular filter element and provides a fluid curtain that preferentially directs the larger particulates to one area of the filter material allowing the remainder of the filter material to remain more efficient.

7 Claims, 10 Drawing Sheets

(56) References Cited

U.S. PATENT DOCUMENTS

| | | | |
|---|---|---|---|
| 3,480,330 A * | 11/1969 | Hirs | B01D 46/0002 118/312 |
| 3,541,764 A * | 11/1970 | Astrom | B01D 46/0068 55/302 |
| 3,594,992 A * | 7/1971 | Carr | B01D 46/0043 55/302 |
| 3,816,978 A * | 6/1974 | O'Dell | B01D 46/04 55/302 |
| 3,963,467 A * | 6/1976 | Rolschau | B01D 46/04 55/284 |
| 3,980,457 A | 9/1976 | Smith | |
| 4,162,906 A | 7/1979 | Sullivan et al. | |
| 4,409,005 A | 10/1983 | McKendrick | |
| 4,433,987 A * | 2/1984 | Lenox | B01D 46/0004 55/319 |
| 4,516,994 A | 5/1985 | Kocher | |
| 4,629,482 A | 12/1986 | Davis | |
| 4,865,627 A | 9/1989 | Dewitz et al. | |
| 4,867,885 A | 9/1989 | Yen | |
| 5,143,530 A | 9/1992 | Haldipur et al. | |
| 5,223,008 A | 6/1993 | Troxell | |
| 5,685,887 A | 11/1997 | Mochida | |
| 5,752,999 A | 5/1998 | Newby et al. | |
| 5,795,369 A | 8/1998 | Taub | |
| 5,972,059 A | 10/1999 | Morgan | |
| 6,537,350 B2 | 3/2003 | Gates-Anderson et al. | |
| D494,329 S | 8/2004 | Thur et al. | |
| 7,850,750 B2 | 12/2010 | Park et al. | |
| 8,043,394 B2 | 10/2011 | Mital et al. | |
| 8,147,575 B2 | 4/2012 | Lucas | |
| 8,840,698 B2 | 9/2014 | Chmayssani et al. | |
| 2005/0076621 A1 | 4/2005 | Chang | |
| 2009/0158926 A1 * | 6/2009 | Taylor | B01D 46/0021 95/70 |
| 2013/0205726 A1 | 8/2013 | Wada et al. | |
| 2013/0312609 A1 | 11/2013 | van Vorselen | |
| 2014/0096683 A1 * | 4/2014 | Azwell | B01D 46/2403 95/268 |
| 2014/0151282 A1 * | 6/2014 | Brown | B01D 29/52 210/232 |
| 2014/0262757 A1 | 9/2014 | Forbes | |

* cited by examiner

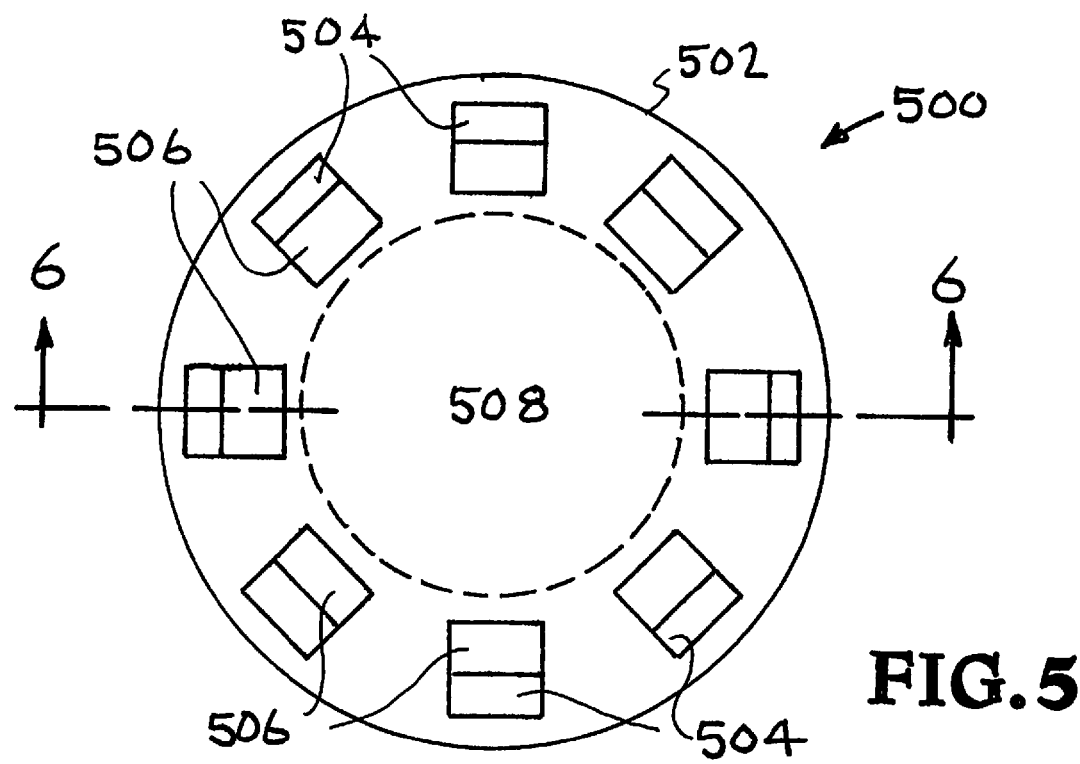
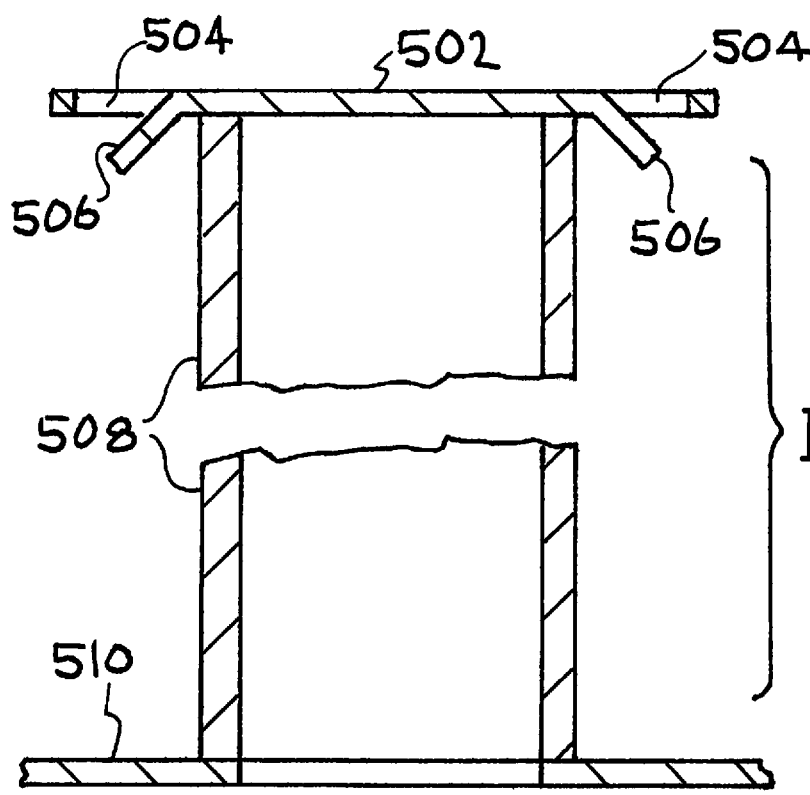
FIG. 5
FIG. 6

ANTI-CLOGGING FILTER SYSTEM

CROSS-REFERENCE TO RELATED APPLICATIONS

The present application is a Division of application Ser. No. 13/610,331 filed Sep. 11, 2012, which claims benefit under 35 U.S.C. §119(e) of U.S. Provisional Patent Application No. 61/535,713 filed Sep. 16, 2011 entitled "filter anti-clogging devise," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present invention relates to filters and more particularly to a filter anti-clogging device.

State of Technology

The normal function and operation of air filters is to capture particulates. These particulates accumulate on the surface of the filters reducing their efficiency very quickly and typically in a linear fashion.

U.S. Pat. No. 4,629,482 for a HEPA room air purifier issued Dec. 16, 1986 to George B. Davis provides the following state of technology information: "This invention is directed to portable room air purification units capable of producing clean air flow rates of 350 cubic feet per minute and up and which incorporate cylindrical HEPA filter elements which are mounted to filter air flowing into the units. Air flow is created by centrifugal fans mounted within dish shaped base members so as to direct air outwardly through specially oriented and sized exhaust openings in a non-turbulent manner. In the event air filters become clogged or need replacement, the reduction of air flow through the filters will cause air to be drawn intermittently through the exhaust openings thereby creating a pulsation of air which is a positive indication that the filter should be replaced. The units are also designed to be enlarged to provide greater air flow capacity by stacking interfitting filter elements in vertical relationship within the units."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides an anti-clogging filter system for filtering a fluid containing large particles and small particles includes an enclosure. At least one individual elongated tubular filter element is located in the enclosure with the individual elongated tubular filter element having an internal passage, a closed end, an open end, and a filtering material in or on the individual elongated tubular filter element. The fluid travels through the open end of the elongated tubular element and through the internal passage and through the filtering material. An anti-clogging element is positioned on or adjacent the individual elongated tubular filter element and provides a fluid curtain that preferentially directs the larger particulates to one area of the filter material allowing the remainder of the filter material to remain more efficient.

The present invention has use on a wide variety of filter systems. For example, the present invention has use on high temperature HEPA filters used in the pharmaceutical industry and nuclear industry. The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIG. 5 is a top view of a filter element according to one embodiment of the invention.

FIG. 6 is a side view of a filter element according to one embodiment of the invention.

DETAILED DESCRIPTION OF SPECIFIC EMBODIMENTS

Figure 1:
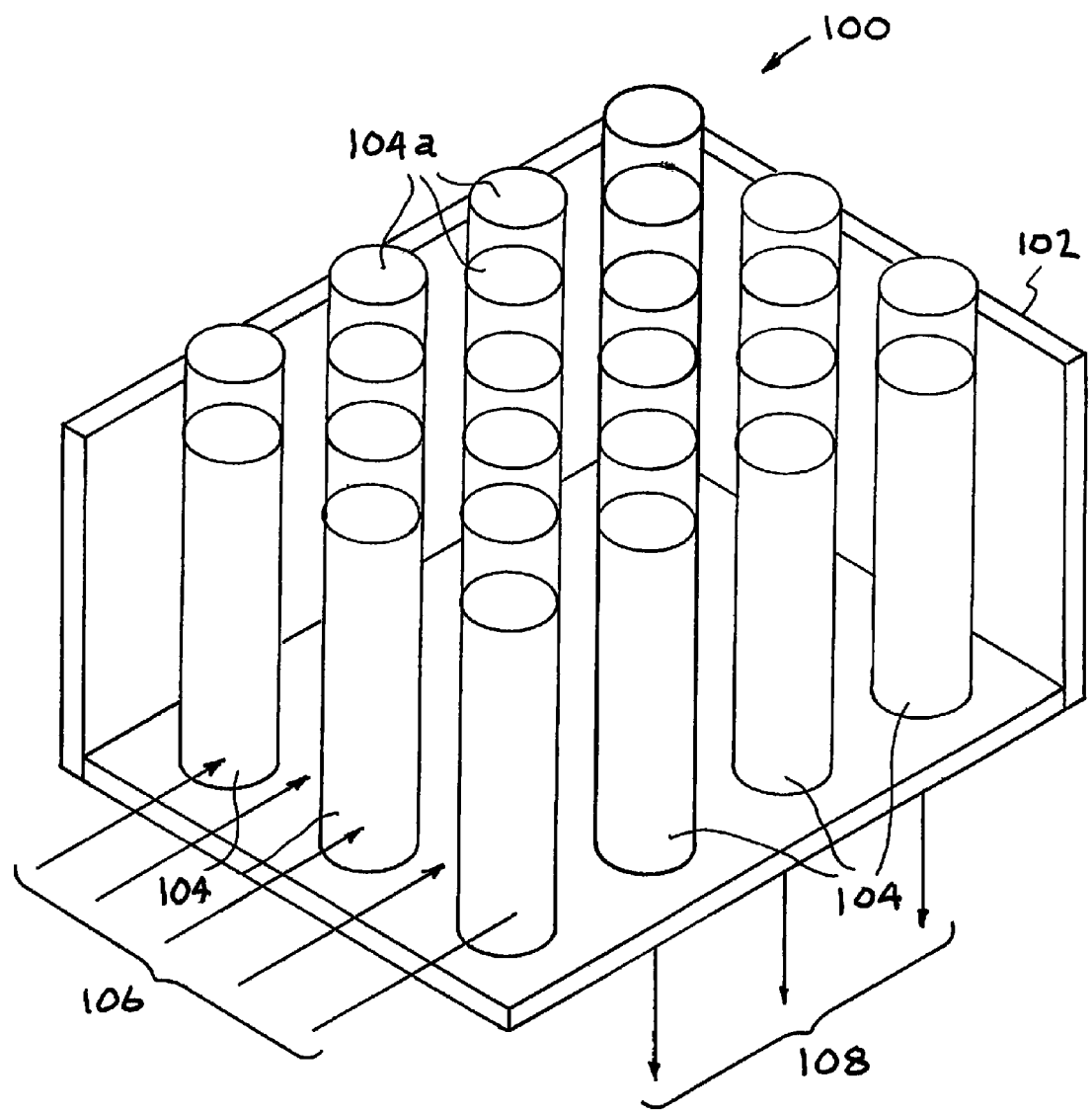
FIG. 1 illustrates a filter unit having a multiplicity of individual filter elements.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides an anti-clogging filter system for filtering a fluid containing large particles and small particles. The system includes an enclosure with a multiplicity of individual elongated tubular filter elements in the enclosure. The elongated tubular filter elements are positioned parallel to each other with each individual elongated tubular filter element having an internal passage, a closed end, an open end. The elongated tubular filter elements are made of filtering material or a filtering material is on each the individual elongated tubular filter element. The fluid travels through the filtering material providing fluid filtration. An anti-clogging element is positioned on or adjacent the individual elongated tubular filter element. The anti-clogging element creates a fluid curtain that preferentially directs the large particulates to one area of the filtering material and the small particulates to another area of the filtering material.

One embodiment of an anti-clogging filter system constructed in accordance with the present invention is illustrated in FIG. 1. The filter system is designated generally by the reference numeral 100. The anti-clogging filter system 100 filters a fluid containing large particles and small. The filter system 100 includes a filter enclosure 102. A series of tubular filter elements 104 are contained in the filter enclosure 102. The tubular filter elements 104 are closed at the top as illustrated by the closed tops 104a. The tubular filter elements 104 are mounted on a surface of the filter enclosure 102 in a manner that provides a fluid tight seal between the filter element and the surface of the filter enclosure 102. The tubular filter elements 104 have an open end that provides a fluid passage from the internal passage of the tubular filter elements 104 to the outside of the filter enclosure 102.

The fluid to be filtered is illustrated entering the enclosure 102 by the arrow 106. The tubular filter elements 104 are closed at the top and open at the bottom to create fluid flow from the outside of the tubular filter elements 104 through the sides of the tubular filter elements 104 into the internal passage of the tubular filter elements 104 and out the bottom open ends of the tubular filter elements 104. The fluid to be filtered is illustrated exiting the enclosure 102 by the arrow 108. The elongated tubular filter elements are made of filtering material or a filtering material is on each of the individual elongated tubular filter elements and the fluid being filtered passes through the filter material.

The anti-clogging filter system 100 filters a fluid containing large particles and small particles. An anti-clogging element is located on or adjacent the individual elongated tubular filter elements. In one embodiment the anti-clogging element provides a fluid diverter positioned on or proximate the closed end of the individual elongated tubular filter elements that creates a fluid curtain and preferentially directs the large particulates to one area of the filtering material and directs the small particulates to another area of the filtering material. The anti-clogging element results in more particulates staying in the fluid stream longer and loading the filter material toward its bottom. That is, the filter material will load up from the bottom up as opposed to evenly across the full surface of the filter material. The filter will remain operable allowing fluid flow longer than filtering systems without the anti-clogging element. The present invention has use on a wide variety of filter systems. For example, the present invention has use on high temperature HEPA filters used in the pharmaceutical industry and nuclear industry.

Figure 2:
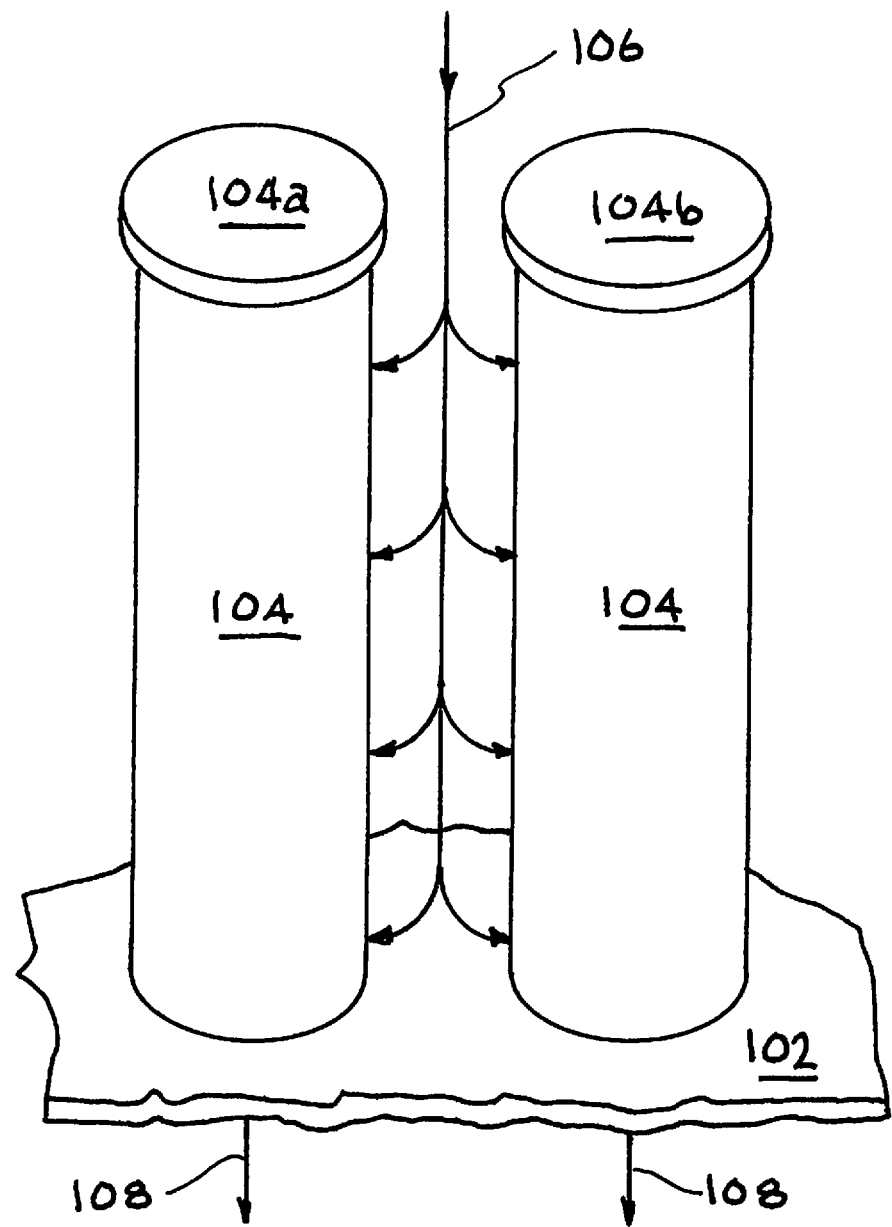
FIG. 2 illustrates two of the tubular filter elements of the filter unit shown in FIG. 1.

Referring now to FIG. 2, two of the tubular filter elements 104 of the filter system 100 of FIG. 1 are illustrated. The tubular filter elements 104 are the filter elements shown contained in the filter enclosure 102 in FIG. 1. The tubular filter elements 104 are closed at the top as illustrated by the closed tops 104a shown in FIG. 2. This causes fluid flow from the outside of the tubular filter elements 104 through the sides of the tubular filter elements 104 into the internal passage of the tubular filter elements 104 as illustrated by the arrows 106. The tubular filter elements 104 are made of filtering material or a filtering material is on each the individual tubular filter element and the fluid is filtered as it passes through the sides of the tubular filter elements 104 into the internal passage of the tubular filter elements 104. The tubular filter elements 104 are open at the bottom to allow fluid flow from the internal passage of the tubular filter elements 104 out the bottom open ends of the tubular filter elements 104 as illustrated by the arrows 108.

Figure 3:
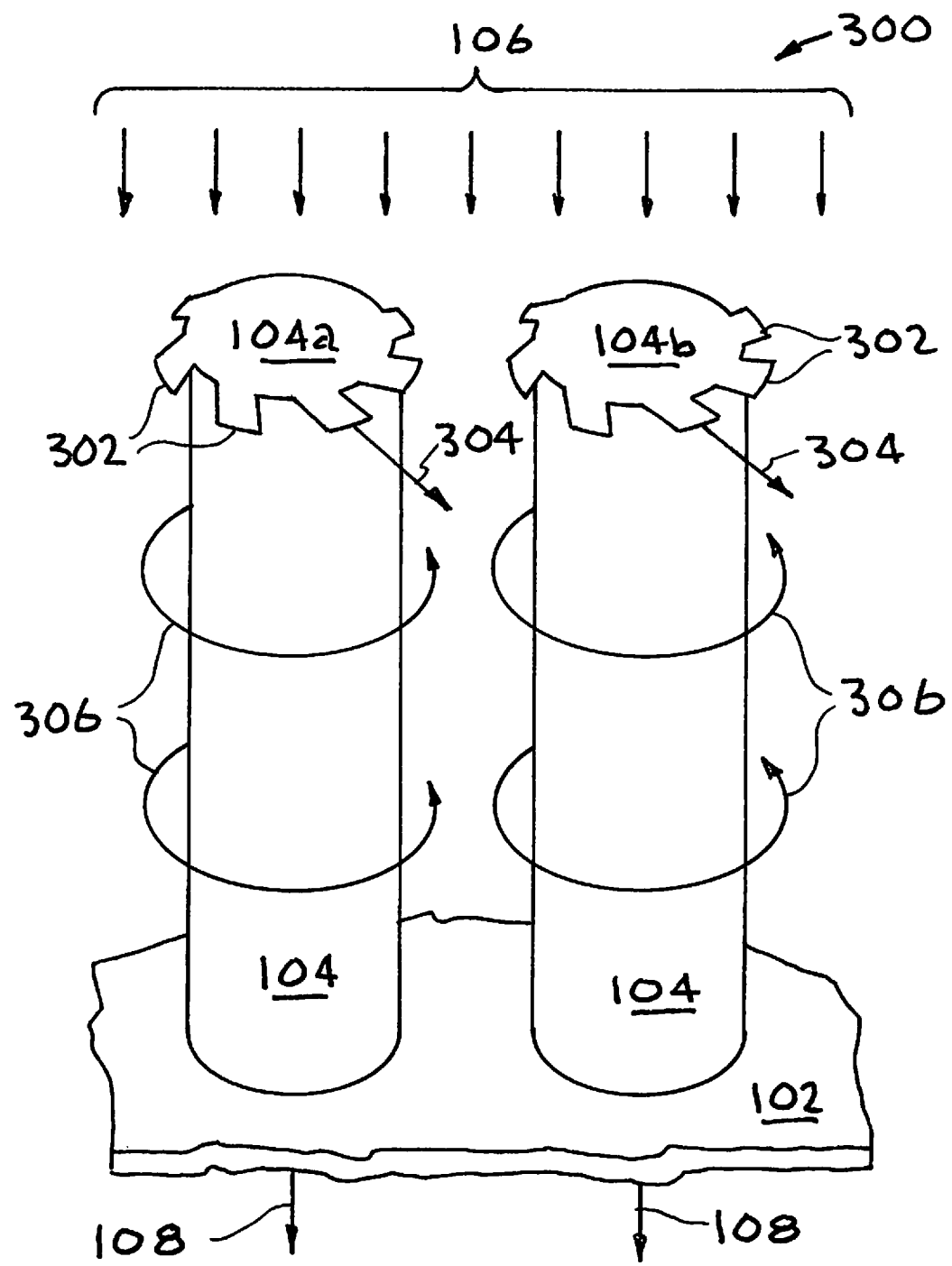
FIG. 3 illustrates the anti-clogging filter apparatus attached around the outside of the tubular filter.

Referring now to FIG. 3, additional details of the anti-clogging filter system 100 are illustrated. Two of the tubular filter elements 104 of the filter system 100 of FIG. 1 are illustrated in greater detail in FIG. 3. The tubular filter elements 104 are the filter elements shown contained in the filter enclosure 102 in FIG. 1. The tubular filter elements 104 are closed at the top as illustrated by the closed tops 104a shown in FIG. 3. This causes fluid flow from the outside of the tubular filter elements 104 through the sides of the tubular filter elements 104 into the internal passage of the tubular filter elements 104 as illustrated by the arrows 106. The tubular filter elements 104 are made of filtering material or a filtering material is on each the individual tubular filter element and the fluid is filtered as it passes through the sides of the tubular filter elements 104 into the internal passage of the tubular filter elements 104. The tubular filter elements 104 are open at the bottom to allow fluid flow from the internal passage of the tubular filter elements 104 out the bottom closed end 104a of the tubular filter elements 104 as illustrated by the arrows 108.

The anti-clogging filter system 100 filters a fluid containing large particles and small particles. A fluid diverter is positioned on or proximate the closed end 104a of the individual elongated tubular filter elements. The fluid diverter creates a fluid curtain that preferentially directs the large particulates to one area of the filtering material and directs the small particulates to another area of the filtering material. As shown in FIG. 3, tubulator vanes 302 are positioned on or proximate the closed end 104a of the individual elongated tubular filter elements. The tubulator vanes 302 cause the fluid to swirl around the filter element 104 causing particulate to be centripetally pushed away from the face of the filter element. The tubulator vanes 302 cause the fluid to be diverted as illustrated by the arrow 304. The fluid swirling around the filter element 104 is illustrated by the arrows 306.

The tubulator vanes 302 create a fluid curtain around the filter elements 104. The fluid curtain preferentially directs the large particulates to one area of the filtering material and directs the small particulates to another area of the filtering material. This results in more particulate staying in the fluid stream longer and loading the filter element 104 toward its bottom. That is, the element 104 will load up from the bottom up as opposed to evenly across the full surface of the filter. The filter will remain operable, (allow fluid flow longer) than without the tubulator. The present invention has use on filters such as high temperature HEPA filters used in the pharmaceutical industry and nuclear industry.

Figure 4:
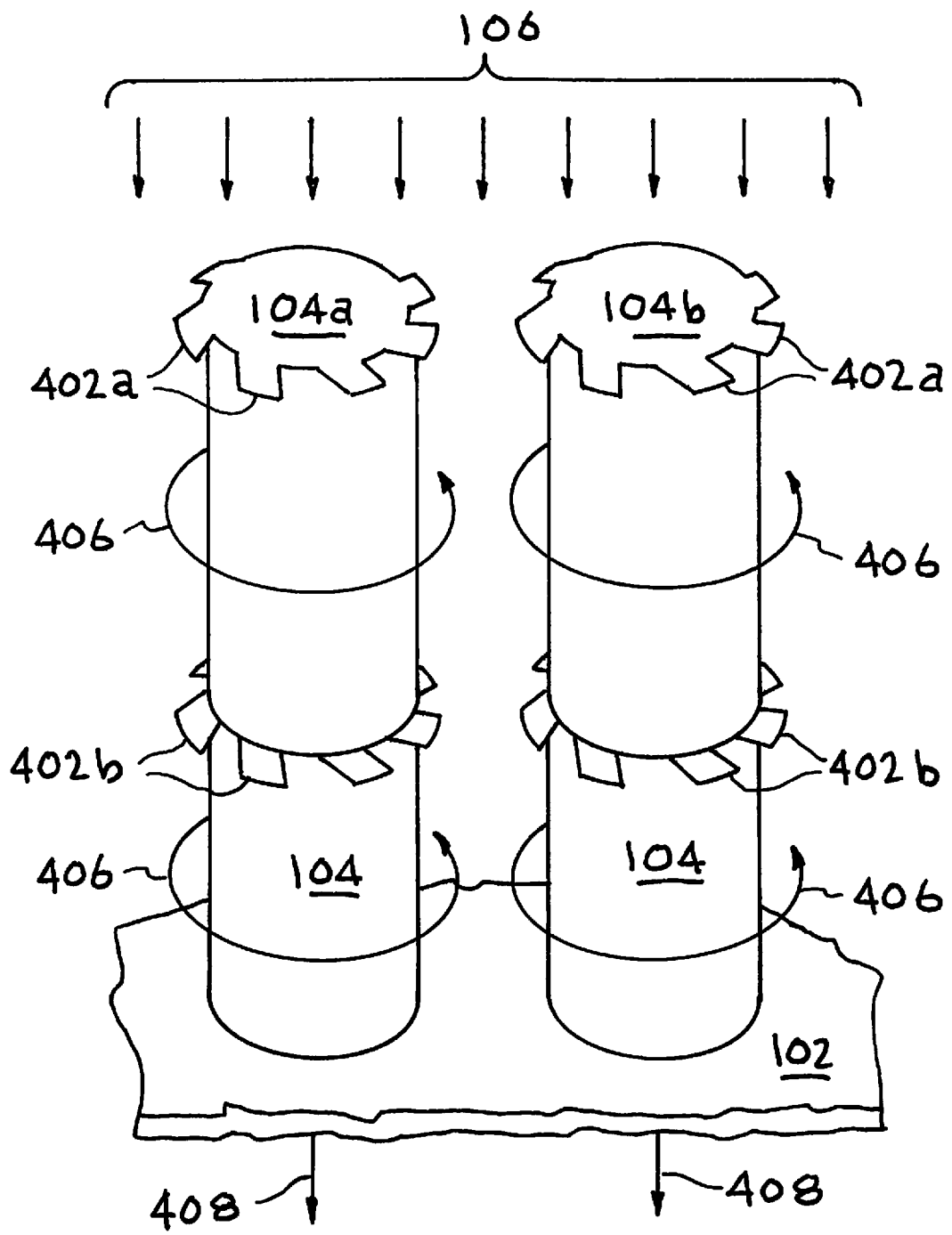
FIG. 4 illustrates multiple anti-clogging filter units attached around the outside of the tubular filter.

Multiple anti-clogging filter units attached around the outside of the tubular filter are illustrated in FIG. 4. The tubular filter elements 104 have multiple sets of vanes 402a, 402b, etc. extending from the body of the tubular filter elements 104. The anti-clogging filter system 400 uses the fluid filter tubulator vanes 402a, 402b, etc. to cause debris laden fluid to swirl around the filter element causing the particulate to be centripetally pushed away from the face of the filter element. The vanes 402a, 402b are angled to create swirls 406 in the fluid flow. Additional anti-clogging filter systems can be fitted along the shaft of the filter to keep the fluid swirling and particulate moving further still. The filter will tend to load up at the base (exhaust end) of the filter.

Referring now to FIGS. 5 and 6 another embodiment of an anti-clogging filter system of the present invention is illustrated. This embodiment is designated generally by the 500. A top view of the anti-clogging filter system 500 is shown in FIG. 5 and a side view of the anti-clogging filter system 500 is shown in FIG. 6. The anti-clogging filter system 500 provides a diverter plate 502 that serves two functions. The first function is to seal the upper end of the filter 508. The second function is for the diverter vanes 506 to cause a swirling motion to the media that is to be filtered. The imparted swirling motion will divert larger particles away from the body of the filter 508 thus ensuring that the filter 500 doesn't become clogged.

The anti-clogging filter system 500 uses fluid filter tubulator vanes 506 to cause debris laden fluid to swirl around the filter element causing the particulate to be centripetally pushed away from the face of the filter element. The tubular filter elements have vanes 506 extending from the body of the tubular filter elements. The vanes 506 create swirls in the fluid flow. The tubular filter elements vanes 506 extend from a ring 502. The tubular filter elements vanes 506 are fabricated by cutting sections 504 of ring and the tubular filter elements vanes 506 extended downward to enable them to create swirls in the fluid flow.

Figure 7A:
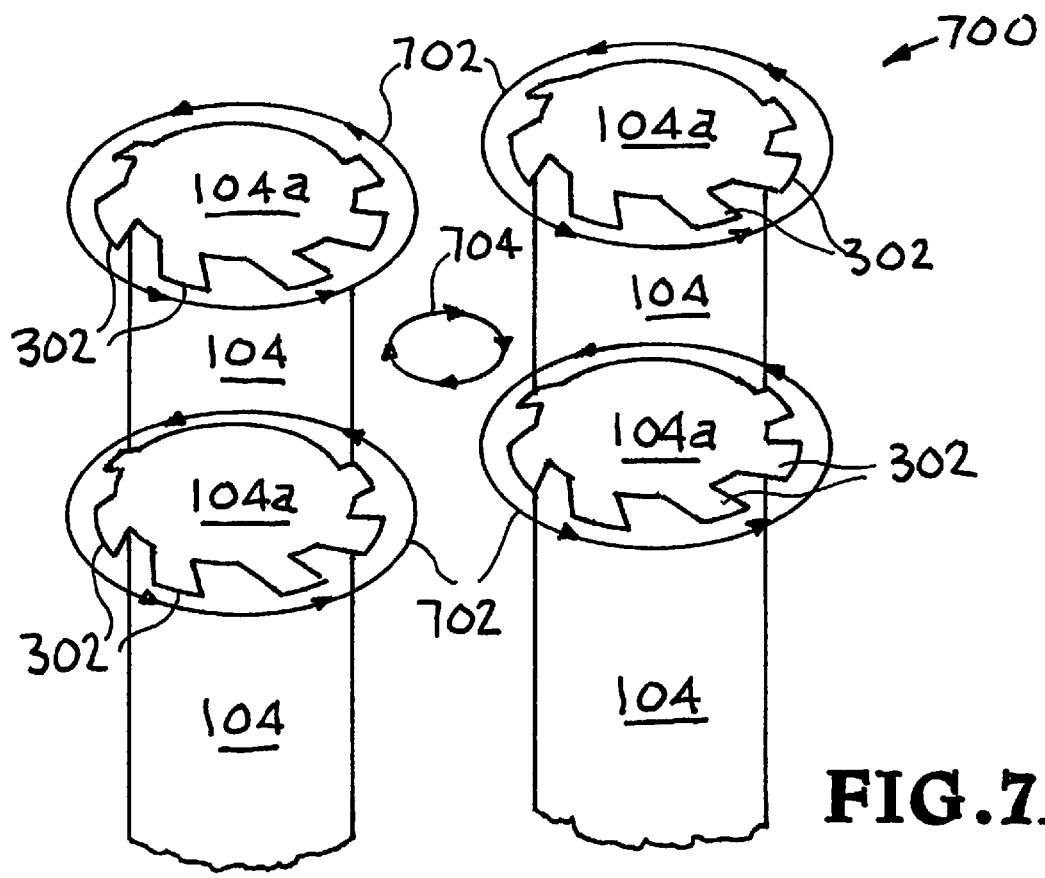
FIGS. 7A and 7B illustrate a filter unit with rows of filter elements.
Figure 7B:
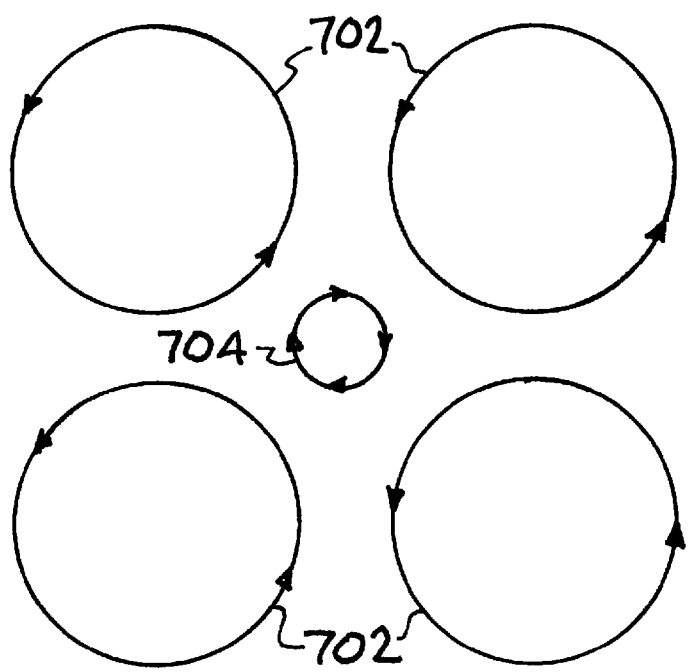

Another embodiment of an anti-clogging filter system constructed in accordance with the present invention is illustrated in FIGS. 7A and 7B. This embodiment of the filter system is designated generally by the reference numeral 700. The reference numerals used in FIG. 1 are also used in FIG. 7A to identify the same structure.

The anti-clogging filter system 700 includes an enclosure with a multiplicity of individual elongated tubular filter elements 104 in the enclosure. The elongated tubular filter elements 104 are positioned parallel to each other in rows. Fluid diverter elements are positioned on or proximate the closed end 104a of the individual elongated tubular filter elements 104. The fluid diverter elements in one embodiment are tubulator vanes 302 positioned on or proximate the closed end 104a of the individual elongated tubular filter elements. The tubulator vanes 302 cause the fluid to swirl around the filter element 104 causing particulate to be centripetally pushed away from the face of the filter element. The tubulator vanes 302 cause the fluid to swirl as illustrated by the arrows 702. The swirls 702 of the fluid travel around the tubular filter elements 104 in the same direction. As shown by the arrows 702 the fluid travel around the tubular filter elements 104 in the same direction in each of the rows of tubular filter elements 104. This produces secondary swirls of fluid as indicated by the arrows 704. The secondary swirls of fluid 704 are located in the area between four adjacent tubular filter elements 104.

The filter system 700 includes a filter enclosure 102. A series of tubular filter elements 104 are contained in the filter enclosure 102. The tubular filter elements 104 are closed at the top as illustrated by the closed tops 104a. The tubular filter elements 104 are mounted on a surface of the filter enclosure 102 in a manner that provides a fluid tight seal between the filter element and the surface of the filter enclosure 102. The tubular filter elements 104 have an open end that provides a fluid passage from the internal passage of the tubular filter elements 104 to the outside of the filter enclosure 102. The fluid to be filtered is flows from the outside of the tubular filter elements 104 through the sides of the tubular filter elements 104 into the internal passage of the tubular filter elements 104 and out the bottom open ends of the tubular filter elements 104. The tubulator vanes 302 create a fluid curtain around the filter elements 104. The fluid curtain preferentially directs the large particulates to one area of the filtering material and directs the small particulates to another area of the filtering material. This results in more particulate staying in the fluid stream longer and loading the filter element 104 toward its bottom. That is, the element 104 will load up from the bottom up as opposed to evenly across the full surface of the filter. The filter will remain operable, (allow fluid flow longer) than without the tubulator. The present invention has use on filters such as high temperature HEPA filters used in the pharmaceutical industry and nuclear industry.

Figure 8:
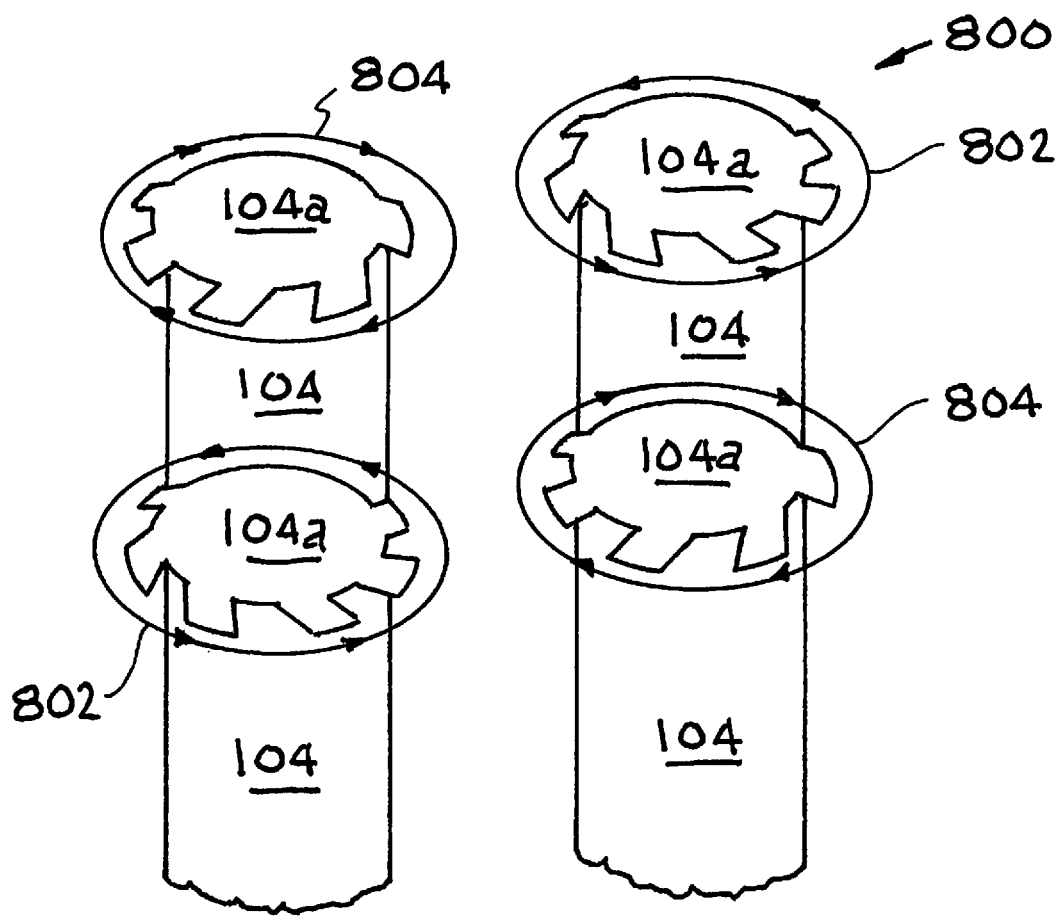
FIG. 8 illustrates another filter unit with rows of filter elements.

Another embodiment of an anti-clogging filter system constructed in accordance with the present invention is illustrated in FIG. 8. This embodiment of the filter system is designated generally by the reference numeral 800. The reference numerals used in FIG. 1 are also used in FIG. 8 to identify the same structure.

The anti-clogging filter system 800 includes an enclosure with a multiplicity of individual elongated tubular filter elements 104 in the enclosure. The elongated tubular filter elements 104 are positioned parallel to each other in rows. Fluid diverter elements are positioned on or proximate the closed end 104a of the individual elongated tubular filter elements 104. The fluid diverter elements in one embodiment are tubulator vanes 302 positioned on or proximate the closed end 104a of the individual elongated tubular filter elements. The tubulator vanes 302 cause the fluid to swirl around the filter element 104 causing particulate to be centripetally pushed away from the face of the filter element. The tubulator vanes 302 cause the fluid to swirl as illustrated by the arrows 802 and 804. The swirls 802 of the fluid travel around the tubular filter elements 104 in the same direction in an individual row. As shown by the arrows 802 the fluid travel around the tubular filter elements 104 in the same direction in one of the rows of tubular filter elements 104. As shown by the arrows 804 the fluid travel around the tubular filter elements 104 in the opposite direction in the adjacent row of tubular filter elements 104. The direction of rotation can be varied among rows or individual tubular filter elements to maximize efficiency.

The filter system 800 includes a filter enclosure 102. A series of tubular filter elements 104 are contained in the filter enclosure 102. The tubular filter elements 104 are closed at the top as illustrated by the closed tops 104a. The tubular filter elements 104 are mounted on a surface of the filter enclosure 102 in a manner that provides a fluid tight seal between the filter element and the surface of the filter enclosure 102. The tubular filter elements 104 have an open end that provides a fluid passage from the internal passage of the tubular filter elements 104 to the outside of the filter enclosure 102. The fluid to be filtered is flows from the outside of the tubular filter elements 104 through the sides of the tubular filter elements 104 into the internal passage of the tubular filter elements 104 and out the bottom open ends of the tubular filter elements 104. The tubulator vanes 302 create a fluid curtain around the filter elements 104. The fluid curtain preferentially directs the large particulates to one area of the filtering material and directs the small particulates to another area of the filtering material. This results in more particulate staying in the fluid stream longer and loading the filter element 104 toward its bottom. That is, the element 104 will load up from the bottom up as opposed to evenly across the full surface of the filter. The filter will remain operable, (allow fluid flow longer) than without the tubulator. The present invention has use on filters such as high temperature HEPA filters used in the pharmaceutical industry and nuclear industry.

Figure 9:
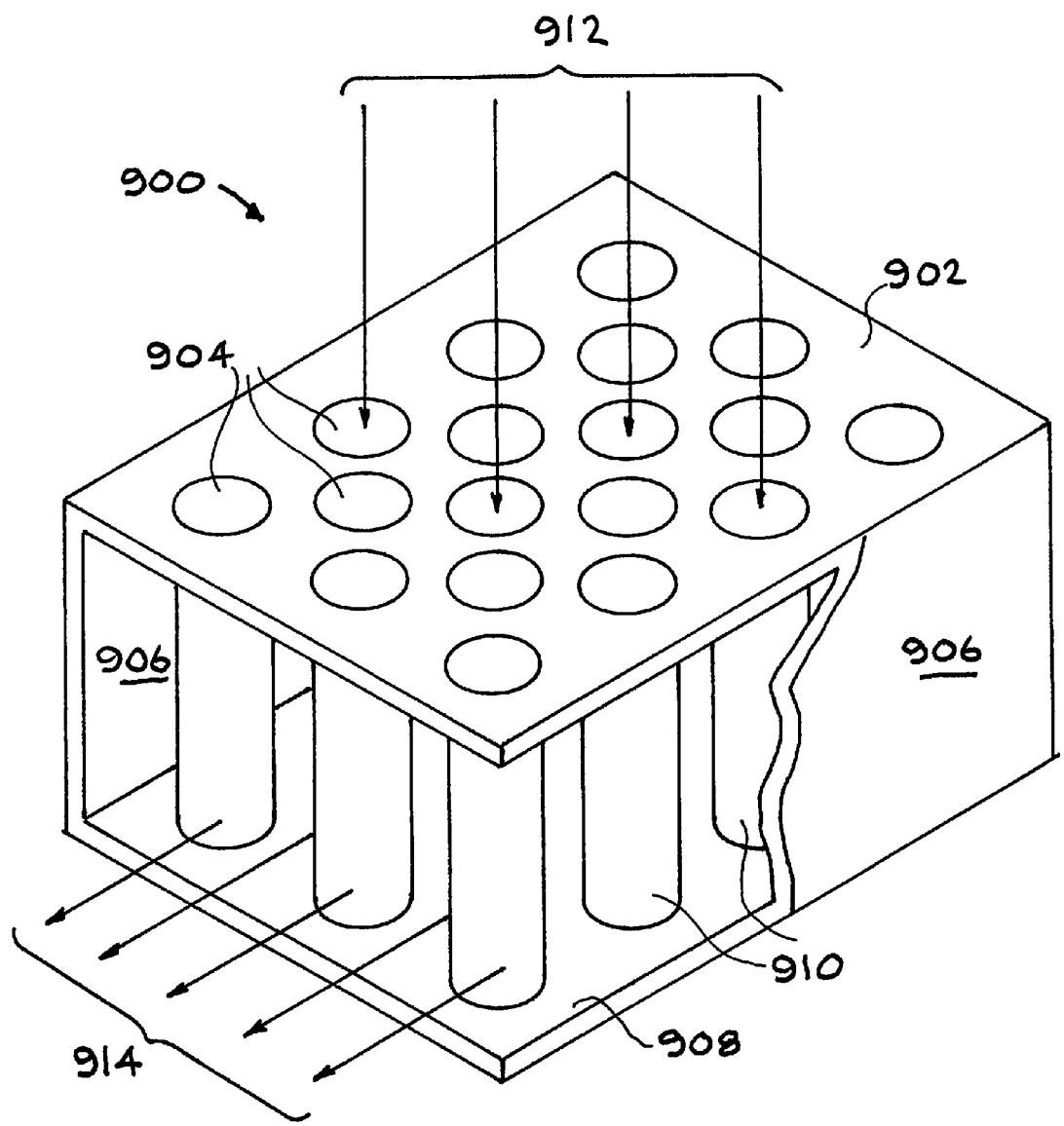
FIG. 9 illustrates another embodiment of a filter unit having a multiplicity of individual filter elements.

Another embodiment of an anti-clogging filter system constructed in accordance with the present invention is illustrated in FIG. 9. The filter system is designated generally by the reference numeral 900. The filter system 900 provides an anti-clogging filter system for filtering a fluid containing large particles and small particles. The system includes an enclosure with a multiplicity of individual elongated tubular filter elements in the enclosure. The elongated tubular filter elements are positioned parallel to each other with each individual elongated tubular filter element having an internal passage, an open end, a closed end. The elongated tubular filter elements are made of filtering material or a filtering material is on each the individual elongated tubular filter element. The fluid travels through the filtering material providing filter fluid. An anti-clogging element is positioned on or adjacent the individual elongated tubular filter element. The anti-clogging element creates a fluid curtain that preferentially directs the large particulates to one area of the filtering material and the small particulates to another area of the filtering material.

The anti-clogging filter system 900 filters a fluid containing large particles and small. The filter system 900 includes a filter enclosure 906 or filter box 906. A series of tubular filter elements 910 are contained in the filter enclosure 906. The tubular filter elements 910 are open at the top as illustrated by the open tops 904. The tubular filter elements 910 are mounted on a surface 908 of the filter enclosure 906 in a manner that provides a fluid tight seal between the filter element 910 and the surface 908 of the filter enclosure 906.

The fluid to be filtered is illustrated entering the enclosure 906 by the arrows 912. The tubular filter elements 910 are open at the top and closed at the bottom to create fluid flow through the sides of the tubular filter elements 904. The elongated tubular filter elements are made of filtering material or a filtering material is on each of the individual elongated tubular filter elements and the fluid being filtered passes through the filtering material. The fluid to be filtered flows through the open tops 904 of the filter elements 910 into the internal passage of the tubular filter elements 910 and through the filtering material. The fluid to be filtered is illustrated exiting the enclosure 906 by the arrows 914.

Figure 10:
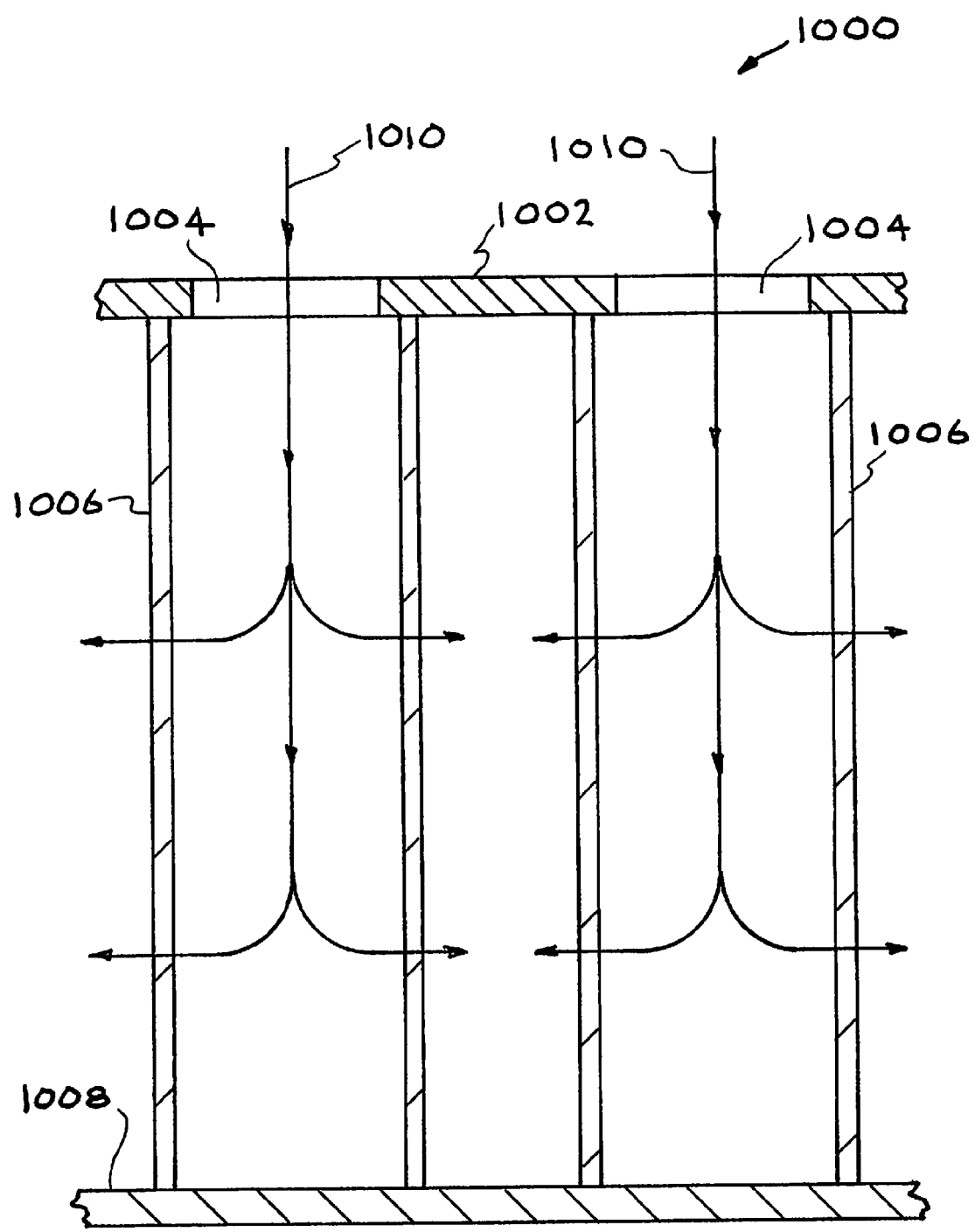
FIG. 10 illustrates two of the tubular filter elements of the filter unit shown in FIG. 9.

Referring now to FIG. 10, two of the tubular filter elements of a filter system of the type shown in FIG. 9 are illustrated. The filter system illustrated in FIG. 10 is designated generally by the reference numeral 1000. The filter system 1000 includes tubular filter elements 1006 that are analogous to the filter elements shown contained in the filter enclosure shown in FIG. 9. The tubular filter elements 1006 are open at the top as illustrated by the open tops 1004 shown in FIG. 10. This causes fluid flow through the open tops 1004 into the internal passage of the tubular filter elements 1006 as illustrated by the arrows 1010. The fluid flow continues through the sides of the tubular filter elements as illustrated by the arrows. The tubular filter elements 1006 are made of filtering material or a filtering material is on each the individual tubular filter element and the fluid is filtered as it passes through the sides of the tubular filter elements 1006. The tubular filter elements 1006 are closed at the bottom to force fluid flow from the internal passage of the tubular filter elements 1006 through the sides of the tubular filter elements 1006. The bottom 1008 of the filter enclosure provides the closed bottoms of the filter elements 1006.

Figure 11:
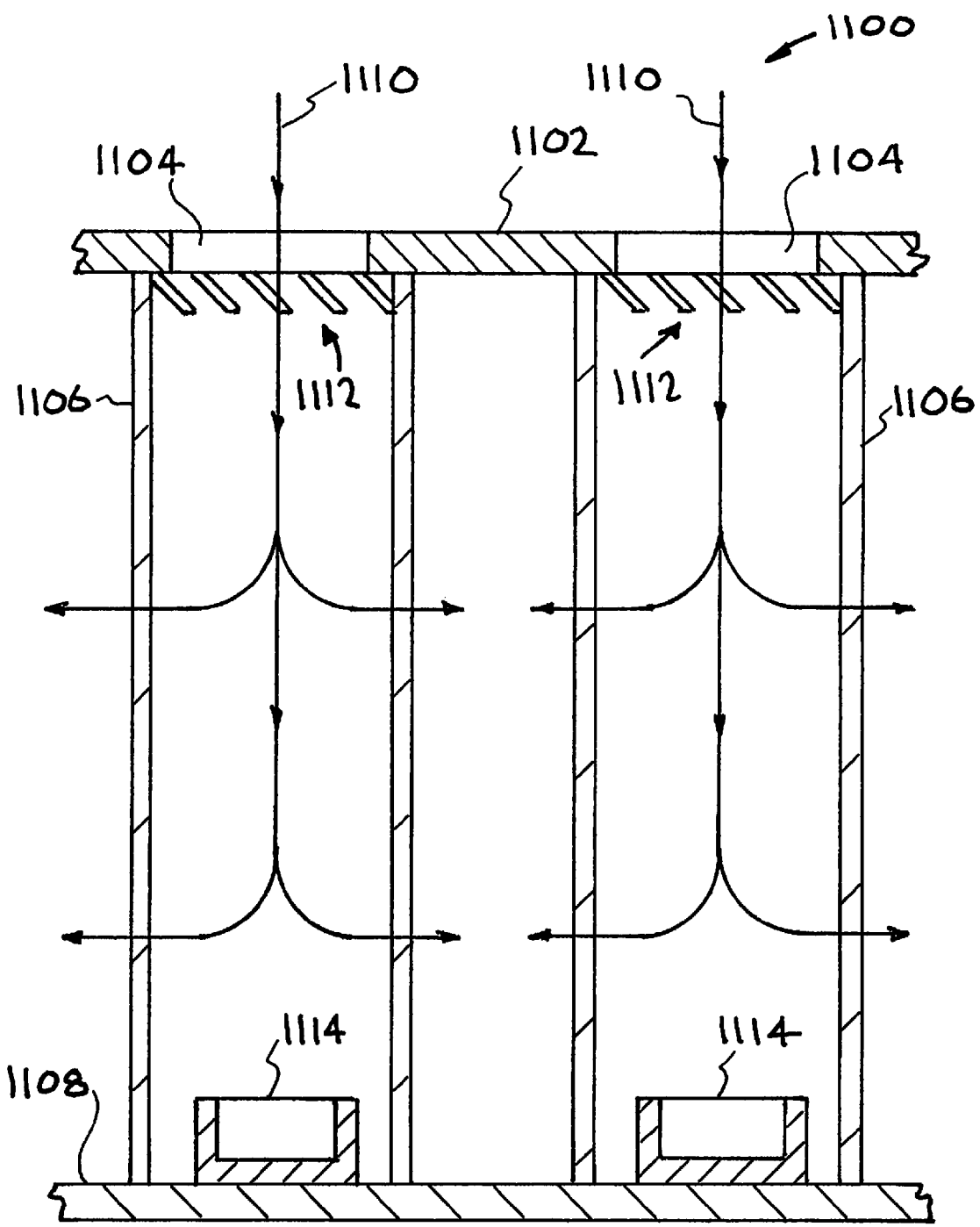
FIG. 11 illustrates the anti-clogging filter apparatus on the inside of the tubular filters shown in FIGS. 9 and 10.

Referring now to FIG. 11, additional details of the anti-clogging filter system are illustrated. Two of the tubular filter elements 904 of the type of filter system illustrate in FIGS. 9 and 10 are illustrated in greater detail in FIG. 11. The anti-clogging filter system is designated generally by the reference numeral 1100. The tubular filter elements 1106 are open at the top as illustrated by the open tops 1104 shown in FIG. 11. This causes fluid flow into the open tops 1104 and through the sides of the tubular filter elements 1106 as illustrated by the arrows 1110. The tubular filter elements 1106 are made of filtering material or a filtering material is on each the individual tubular filter element and the fluid is filtered as it passes through the sides of the tubular filter elements 1106. The tubular filter elements 1106 are closed at the bottom to force fluid flow from the internal passage of the tubular filter elements 1106 through the sides of the tubular filter elements 1106 as illustrated by the arrows.

The anti-clogging filter system 1100 filters a fluid containing large particles and small particles. A fluid diverter 1112 is positioned in the internal passage on or proximate the open end 1104 of the individual elongated tubular filter elements. The fluid diverter 1112 creates a fluid curtain that preferentially directs the large particulates to one area of the filtering material and directs the small particulates to another area of the filtering material. As shown in FIG. 11, tubulator vanes 1112 are positioned in the internal passage on or proximate the open end 1104 of the individual elongated tubular filter elements. The tubulator vanes 1112 cause the fluid to swirl inside the filter element 1106 causing particulate to be centripetally pushed into the face of the filter element. The tubulator vanes 1112 cause the fluid to be diverted. A cup or collector 1114 is located on the bottom 1108 of the enclosure to catch particles.

The tubulator vanes 1112 create a fluid curtain inside the filter elements 1106. The fluid curtain preferentially directs the large particulates to one area of the filtering material and directs the small particulates to another area of the filtering material. This results in more particulate staying in the fluid stream longer and loading the filter element 1106 toward its bottom. That is, the element 1106 will load up from the top down as opposed to evenly across the full surface of the filter. The filter will remain operable, (allow fluid flow longer) than without the tubulator. The present invention has use on filters such as high temperature HEPA filters used in the pharmaceutical industry and nuclear industry.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An anti-clogging filter apparatus for filtering a fluid containing large particles and small particles, comprising:
   an enclosure having an enclosure surface;
   a multiplicity of individual elongated tubular filter elements in said enclosure with each of said individual elongated tubular filter elements having an internal passage,
a closed end,
an open end; and
a filtering material in or on said individual elongated tubular filter elements,
wherein said elongated tubular filter elements are mounted on said enclosure surface so that the fluid travels from said enclosure through said filtering material and through said open end and out of said enclosure, wherein said filtering material has different areas; and
an anti-clogging element on each of said individual elongated tubular filter elements,
wherein said individual elongated tubular filter elements are arranged in rows in said enclosure and
wherein said anti-clogging element on said individual elongated tubular filter elements comprises
a multiplicity of fluid diverters positioned on said individual elongated tubular filter elements that close said internal passage of said individual elongated tubular elements and provide said closed end of said individual elongated tubular elements,
each of said fluid diverter elements including a multiplicity of individual tubulator vanes positioned outside of said internal passage and outside of said individual elongated tubular elements with said individual tubulator vanes extending from said closed end of said individual elongated tubular elements,
wherein said tubulator vanes create fluid curtains that cause the fluid to swirl around said individual elongated tubular elements and that direct the large particulates and the small particulates to said different areas of said filtering material as said fluid curtain swirls around said elongated tubular filter elements.

2. The anti-clogging filter apparatus for filtering a fluid containing large particles and small particles of claim 1 wherein said fluid diverters include a ring and wherein said tabulator vanes extend from said ring.

3. An anti-clogging filter apparatus for filtering a fluid containing large particles and small particles, comprising:
an enclosure having an enclosure surface;
an individual elongated tubular filter element in said enclosure with said individual elongated tubular filter element having
an internal passage,
a closed end,
an open end; and
a filtering material in or on said individual elongated tubular filter element, wherein said elongated tubular filter element is mounted on said enclosure surface so that the fluid travels from said enclosure through said filtering material into and through said internal passage and through said open end and out of said enclosure, wherein said filtering material has different areas; and
an anti-clogging element on or adjacent said individual elongated tubular filter element,
wherein said anti-clogging element on or adjacent said individual elongated tubular filter elements comprises a fluid diverter positioned over said open end of said individual elongated tubular filter element that closes said internal passage of said individual elongated tubular element and provides said closed end of said individual elongated tubular element and wherein said fluid diverter includes tubulator vanes positioned outside of said closed end of said individual elongated tubular element, wherein said tubulator vanes create a fluid curtain that preferentially directs the large particulates and the small particulates to said different areas of said filtering material and wherein said fluid curtain comprises swirls that travel around said elongated tubular filter elements.

4. The anti-clogging filter apparatus for filtering a fluid containing large particles and small particles of claim 3 wherein said fluid curtain comprises swirls that travel around said elongated tubular filter elements in the same direction.

5. The anti-clogging filter apparatus for filtering a fluid containing large particles and small particles of claim 3 further comprising a second fluid diverter positioned outside of individual elongated tubular filter element wherein said fluid diverter and said second fluid diverter create at least two fluid curtains that comprise swirls and wherein said swirls travel around said elongated tubular filter element in the same direction.

6. A method of filtering a fluid containing large particles and small particles, comprising the steps of:
providing an enclosure with an enclosure surface;
providing an elongated tubular filter element in said enclosure, said individual elongated tubular filter element having an internal passage, a closed end, an open end, and a filtering material in or on said individual elongated tubular filter element wherein said filtering material has different areas;
providing an anti-clogging element on said at least one elongated tubular filter element located over said open end of said individual elongated tubular filter element that closes said internal passage of said individual elongated tubular element and provides said closed end of said individual elongated tubular element; and
directing the fluid into said enclosure to said anti-clogging element and said individual elongated tubular filter element through said filtering material and through said internal passage of said individual elongated tubular filter element and out of said enclosure through said open end of said individual elongated tubular filter element,
wherein said step of providing an anti-clogging element comprises providing a fluid diverter positioned over said open end of said individual elongated tubular filter element that closes said internal passage of said individual elongated tubular element and provides said closed end of said individual elongated tubular element, wherein said anti-clogging element creates an fluid curtain that preferentially directs the large particulates and the small particulates to said different areas of said filtering material.

7. The anti-clogging filter method of filtering a fluid containing large particles and small particles of claim 6 wherein said step of providing an anti-clogging element comprises the step of providing an anti-clogging element having tubular element vanes extend from a ring.

* * * * *